Patented Oct. 14, 1947

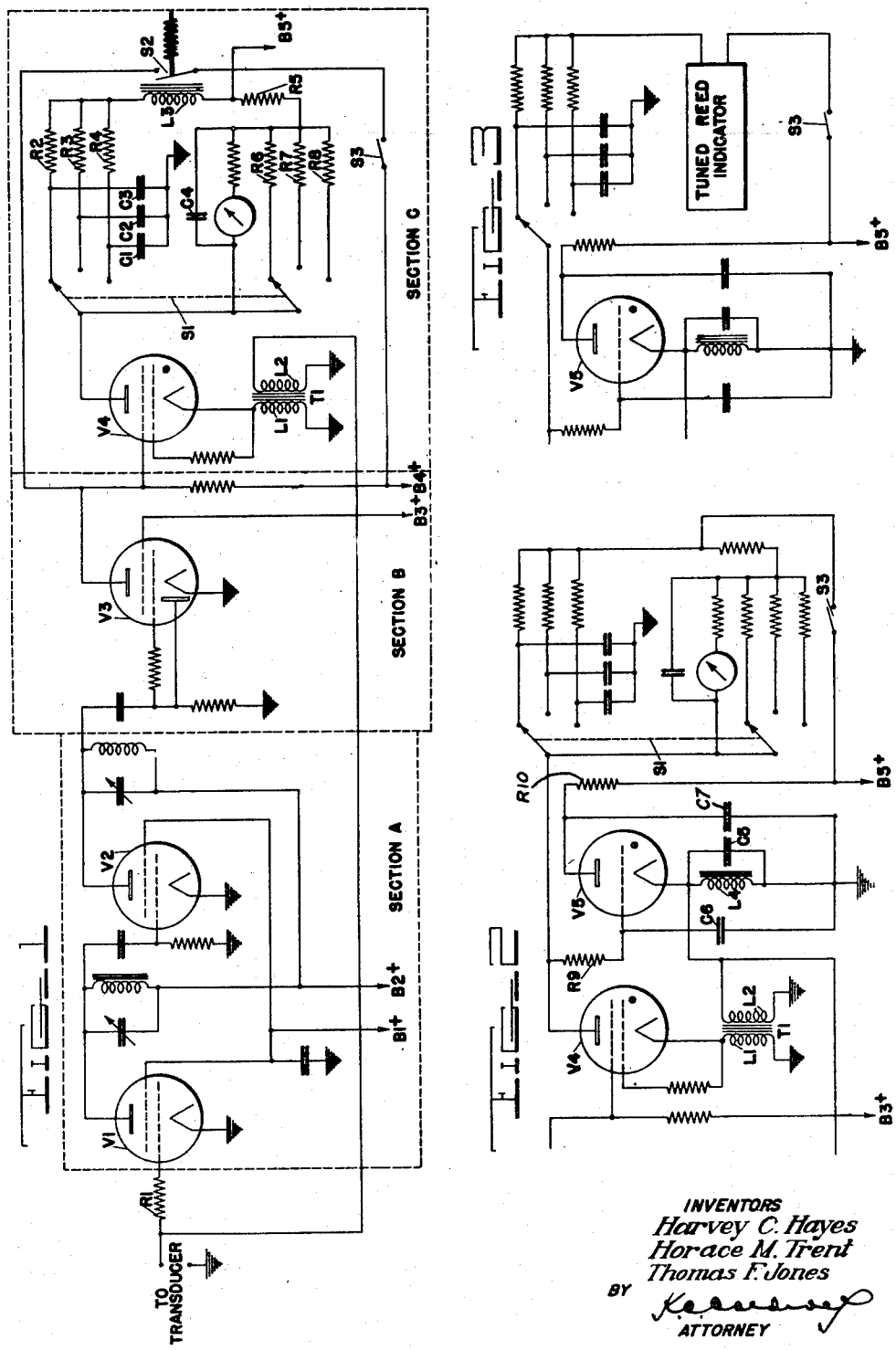

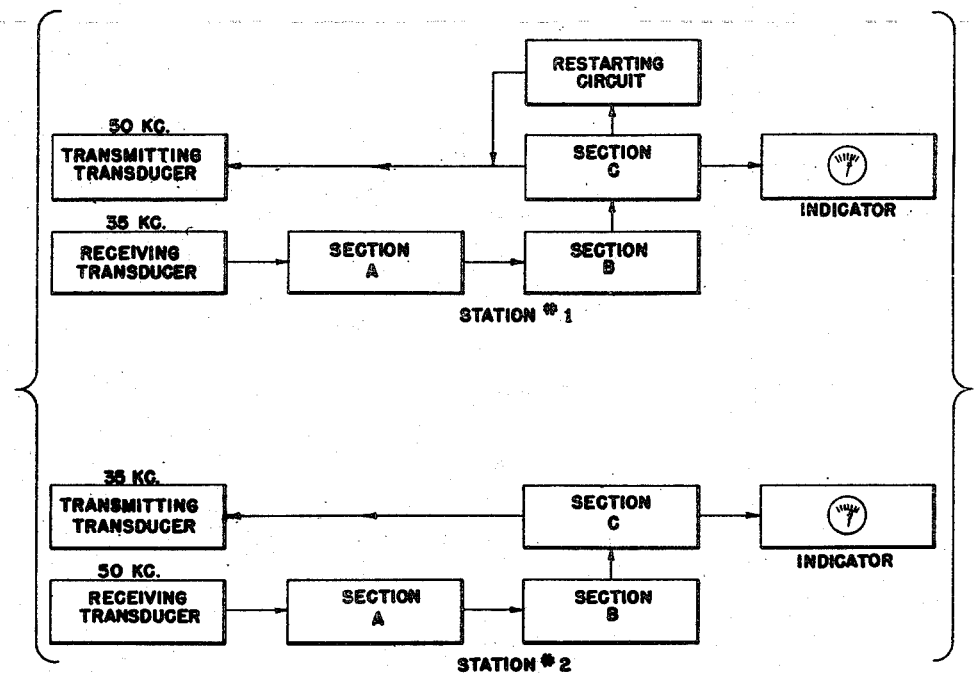

2,428,799

UNITED STATES PATENT OFFICE 2,428,799

DISTANCE MEASURING

Harvey C. Hayes, Washington, D. C., and Horace M. Trent and Thomas F. Jones, Alexandria, Va.

Application January 24, 1942, Serial No. 428,138

4 Claims. (Cl. 177—352)

(Granted under the act of March 3, 1883, as amended April 30, 1928; 370 O. G. 757)

This invention relates to a method and means for measuring the distance to a distant object.

The method involves the measurement of the time of transit of a signal from a transducer to the object plus the time of transit of the resulting echo from the object back to the transducer. If V is the velocity of propagation of the signal in the medium and D is the distance to the object, the time of transit will be $$t = \frac{2D}{V}$$

Thus if V is known and $t$ is measured, D can be found.

Although this principle is not new, the method employed to measure the time of transit or the distance is new. So also is the means used in carrying out the method. The method employed comprises, briefly, the generation and transmission of a pulse of energy at audio or radio frequencies from a transducer, the utilization of the resulting echo to initiate the next pulse, the utilization of each succeeding echo in the same manner and the measurement of the frequency of the resulting train of pulses. The number of transmissions per second will be equal to $$\frac{V}{2D}$$

The method will fail if provision is not made to restart the cycle of operations in the event that an echo fails to trigger off the next pulse. Most applications of the method occur under conditions in which either the transmitter or the target or both are in motion. Under such circumstances some echoes are bound to fail in triggering the next pulse. Provision must also be made for initiating the orignal pulse.

It is, therefore, an object of this invention to provide an accurate method for measuring the distance to a distant object.

It is a further object to provide such a method utilizing the transit time of a signal to the object plus the transit time of its echo from the object to the transmitter.

It is another object to provide such a method, in which the reception of each echo initiates the transmission of another pulse and in which the frequency of the sequence of pulses is measured to determine the distance of the object.

It is still another object of the invention to provide a novel means for carrying the above described method into practice.

It is a further object of the invention to provide means to initiate an original pulse, to utilize the echoes from a reflecting object to initiate succeeding pulses in order to maintain a train of pulses and to restart the sequence of pulses should echo initiation be interrupted.

It is another object of this invention to provide a method and means whereby each of two stations whether stationary or moving with respect to each other, may quickly and accurately determine their distance apart.

Other objects will become apparent from a consideration of the following description taken together with the accompanying drawing, in which:

Fig. 1 is a circuit diagram showing one embodiment of apparatus for carrying out the invention including one means for restarting the transmission of pulses;

Fig. 2 is a circuit diagram of a portion of the apparatus of Fig. 1 showing an alternative means for restarting transmission, and Fig. 3 is a circuit diagram of a portion of the apparatus of Fig. 1 showing an alternative means for measuring and indicating pulse frequency.

Fig. 4 is a block diagrammatic showing of a system embodying the invention.

In carrying out the method a transducer is required. In this description a transducer is taken to mean a device capable of transforming electrical energy into energy which can be transmitted through the medium encountered and vice versa. While a transducer is required, there is nothing inherent in the method which limits the apparatus to any particular type of transducer and, therefore, none is shown.

In the circuits described below only one transducer is provided for, which therefore must be capable of both emitting and receiving a signal. However, the invention is not limited to the use of a single transducer, but the emitter and the receiver may be separate units and so need not be bilateral. Simplicity and light weight favor the use of a single transducer.

The apparatus works best if the transducer is sharply resonant at the operating frequency. This allows both greater efficiency of transmission and reception and discrimination against unwanted signals.

The circuit can be broken up into several sections as indicated by dotted lines in Fig. 1. Section A is a tuned amplifier which is shown as consisting of two stages associated with electronic tubes $V_1$ and $V_2$. During transmission of a pulse of energy, a very high voltage is applied to the transducer. Since the grid of $V_1$ is also connected to the point of application some protection must be given to the tube. The simplest way of doing this is by use of the resistor $R_1$. Other means can be used without changing the basic operation of the circuit.

Section B includes a rectifier followed by a low frequency amplifier. In Fig. 1 these two functions are performed by a dual purpose tube $V_3$ which simplifies the circuit. The amplifier part is shown connected to the grid of tube $V_4$ as a D. C. amplifier, but capacitative coupling to $V_4$ could be employed as well, in which case the slope of the pulse voltage envelope would be the factor controlling the operation of $V_4$, rather than the amplitude. The tube $V_4$ is a gas-filled tube, of the type known as the Strobotron which may be triggered by the application of a voltage pulse to one of its control grids to permit a rapid surge of energy therethrough, the tube thereupon reverting sharply to the non-conducting state.

The pulse of energy to be fed into the transducer is generated in section C. The illustrated means for producing pulse excitation has the advantage of being simple. A gang switch S' of the double pole variety permits any one of three condensers $C_1$, $C_2$, or $C_3$ to be charged from the B supply through resistors $R_4$, $R_3$ and $R_2$ respectively. Upon the reception of an echo by the transducer and its detection and amplification by the tubes $V_1$, $V_2$ and $V_3$, the output of $V_3$ triggers $V_4$. Thereupon the condenser $C_1$, $C_2$ or $C_3$ discharges through the tube $V_4$ and through $L_1$ the primary of transformer $T_1$, the secondary $L_2$ of which is connected to the transducer. The inductance of the secondary together with the characteristics of the transducer form a resonant circuit, the resonant frequency of which is the resonant frequency of the transducer. A choice of three charging condensers is provided so that pulses of different energy content are available. Continuous wave excitation could be employed also. Due to the nature of the tube $V_4$ condensers $C_1$, $C_2$ or $C_3$ will not discharge therethrough in the absence of a triggering voltage pulse from $V_3$.

The discharge of a condenser through $V_4$ and $L_1$ induces a voltage pulse in $L_2$ which is applied to the transducer. The latter will be shock excited and will execute damped oscillations at its resonant frequency. The echo will then consist of a carrier equal to the resonant frequency together with an infinite number of side bands. The receiver section A is tuned to receive a narrow band of frequencies about the carrier frequency.

In section C is also shown a means for converting the pulse frequency into an indication of distance. This means is essentially a voltmeter which measures the average D. C. potential difference across the charging resistors. $R_5$ and $C_4$ form an R. F. filter to remove the A. C. component from the measured voltage. $R_6$, $R_7$ and $R_8$ are shunt resistors used to change the sensitivity of the meter as the device is switched from one charging condenser to another. The meter need only be a conventional D. C. instrument of the proper sensitivity. However, a meter with a logarithmic scale is preferred for the following reasons: The charge stored per pulse is substantially a constant, $q$. The average current is then $nq$ where $n$ is the number of pulses per second. The measured voltage is $nqR=v$. Previously, it was shown that $$n = \frac{V}{2D}$$

Therefore, $$v = \frac{VqR}{2D} = \frac{K}{D}$$

where $$K = \frac{VqR}{2} \text{ (a constant)}$$

Log $v$=log $k$−log $D$. Consequently, if a meter with a logarithmic movement is employed, distances will form an approximately linear scale thereon.

The design of the transformer $T_1$ is critical. The entire secondary circuit must be designed to produce maximum mechanical motion of the transducer at its resonant frequency. Likewise, the primary circuit ($L_1$, $V_4$, $C_1$, 2 or 3) must have an electrical resonant frequency at least twice the resonant frequency of the transducer if maximum conversion efficiency is to be secured.

A means for automatically restarting the apparatus upon the failure of an echo to perform this function, is shown in Fig. 1. It consists of a quick closing, slow opening relay sufficiently sensitive to be operated by the plate current of $V_4$. The relay consists of a solenoid $L_3$ in the plate circuit of $V_4$ and a spring loaded switch $S_2$ in the grid circuit of $V_4$ operated by the solenoid. Failure of current flow in the plate circuit of $V_4$ allows the switch $S_2$ to close, thus applying a starting voltage to the grid of $V_4$. To start the apparatus initially the switch $S_3$ is closed. The switch $S_2$ will remain closed until the first pulse is transmitted.

An alternative means for restoring the apparatus is shown in Fig. 2. This employs a gas discharge tube $V_5$ such as an OA4G or a WE313. The grid of this tube is connected through a resistance $R_9$ to the plate of $V_4$ and is also connected to one terminal of condenser $C_6$, the other terminal of which is grounded. The resonant circuit $L_4$, $C_5$ in the cathode circuit of $V_5$ is connected to the output terminal of transformer $T_1$ and the input of tube $V_1$. As long as the average current in the plate circuit of $V_4$ is not substantially below that corresponding to a minimum frequency of recurring echo pulses, the voltage impressed upon the grid of $V_5$ remains too low to trigger it off, due to the presence of the resistance $R_9$ and the condenser $C_6$. Upon cessation of current flow in the plate circuit of $V_4$, the voltage impressed through $R_9$ upon the grid of $V_5$ is permitted to become high enough to fire the tube $V_5$. This will permit a surge of current from the condenser $C_7$ through $V_5$ to shock excite the resonant circuit $L_4$, $C_5$ which is resonant at the same frequency as the transmitter, the condenser $C_7$ having been previously charged through resistance $R_{10}$ from the B supply. The resulting pulse to the transducer and consequently to the input of tube $V_1$ will operate through tubes $V_2$ and $V_3$ to effect a resumption of current flow in the plate circuit of $V_4$ and a reapplication of the blocking bias to the grid of $V_5$.

Fig. 3 shows a portion of that part of the apparatus shown in Fig. 2 altered by the substitution of a conventional tuned reed indicator for the voltmeter type frequency meter of Figs. 1 and 2.

The apparatus embodying the invention may be used in other ways. One contemplated use is for the purpose of the mutual determination of the distance between two stations.

The arrangement for such use is illustrated in Fig. 4. Such a determination is, for example, valuable as between ships operating in formations. It can be accomplished very simply by providing at each station transmitting and receiving transducers. These may be separate as shown, or a single transducer may perform both functions by utilizing a pair of resonant frequencies. Only one station need be provided with a restarting circuit. Station #1 is shown provided with one. In order to avoid reception of echoes the receiving and transmitting transducers of each station are tuned to different frequencies as shown in the drawing. It will be noted that the transmitting transducer of station #1 and the receiving transducer of station #2 are tuned to the same frequency and that the other two transducers are tuned to a different but mutually identical frequency. Thus when station #1 transmits on 50 kc. the pulse is received at station #2 and the transmitting transducer of that station is triggered resulting in the transmission of a pulse at 35 kc. which is then received at station #1 and the sequence is restarted by the reception.

While the disclosure has been restricted to a few embodiments, it will be evident to those skilled in the art that many modifications may be made in circuit elements and arrangements without deviating from the nature and scope of the invention as defined in the appended claims. For example, other conventional frequency measuring devices may be employed with satisfactory results. The employment of the method is not limited to a single medium, but might be carried out either by sound signals in gases or liquids or by radio signals.

The invention described herein may be manufactured and used by or for the Government of the United States of America for governmental purposes without the payment of any royalties thereon or therefor.

We claim:

1. Means for determining the distance to a distant object comprising a transducer, a source of voltage, an electronic tube, said tube normally being in a non-conducting state, a transformer having its primary connected to said tube and its secondary connected to said transducer, said secondary and the characteristics of said transducer comprising a circuit resonant at the resonant frequency of said transducer whereby flow of current through said tube will cause a voltage to be applied to said transducer at the resonant frequency thereof, means operable at will to render said tube conducting, a capacitor connected to said tube and to said source of voltage and discharging through said tube when said tube is rendered conducting, whereby a surge of current flows through said tube and said transducer is shock excited to transmit a pulse of energy through the medium surrounding said object, means rendering said tube non-conducting upon discharge of the capacitor, means for detecting and amplifying the reflection of said pulse from said object, means applying said amplified reflection to said tube to render it conducting, thus initiating the transmission of another pulse and establishing a train of pulses, and means measuring the frequency of said train of pulses and indicating said frequency in terms of the distance of said object.

2. Means for determining the distance to a distant object comprising a transducer, a source of voltage, a first electronic tube, said tube being normally in a non-conducting state, means associated with said tube and said transducer in such a manner that flow of current through said tube will cause a voltage to be applied to said transducer at the resonant frequency of said transducer, means operable at will to render said tube conducting, means thereupon causing a surge of current through said tube and thereby shock exciting said transducer and causing it to transmit a pulse of energy into the medium surrounding said object, means responsive to a surge of current through the tube for rendering the tube non-conducting, means for detecting and amplifying the reflection of said pulse from said object, means applying said amplified reflection to said tube to render it conducting, thus initiating the transmission of another pulse and establishing a train of pulses, means measuring the frequency of said pulses and indicating said frequency in terms of the distance of said object, a second electronic tube, means operable by the passage of current through said first tube at regular intervals to maintain said second tube in a non-conducting state, said second tube being rendered conducting upon the interruption of said train of pulses, means producing a surge of current through said second tube and a resonant circuit connected to said second tube and said transducer, said resonant circuit being resonant at the same frequency as said transducer and adapted to shock excite said transducer upon the passage of said surge of current through said second tube, thereby reestablishing said train of pulses.

3. Means for determining the distance to a distant object which comprises an electro-acoustic transducer, a gas-filled tube, said tube being normally non-conducting, means in the output circuit of said tube responsive to the passage of a pulse of voltage therethrough to excite said transducer, means in the anode circuit of said tube for storing electrical energy, a control grid for said tube, means operated by the reception of an acoustic signal by said transducer to apply a voltage pulse to said control grid, thus rendering said tube conducting and causing the discharge of said stored energy therethrough, means rendering said tube non-conducting upon discharge of said stored energy, an auxiliary means for supplying voltage to said control grid to render said tube conducting, means operated by the passage of current through said anode circuit to maintain said auxiliary means inactive, whereby upon the failure of said transducer to receive an acoustic signal for a predetermined interval said auxiliary means will become active and said transducer will be excited.

4. Means for determining the distance to a distant object which comprises a transducer, means for storing electrical energy, means responsive to the receipt by said transducer of an acoustic signal to release such stored energy in the form of an electrical pulse, means to convert said pulse into a train of waves having the frequency at which said transducer is resonant and to apply said train of waves to said transducer to cause said transducer to emit an acoustic signal.

HARVEY C. HAYES.
HORACE M. TRENT.
THOMAS F. JONES.

REFERENCES CITED

The following references are of record in the file of this patent:

UNITED STATES PATENTS

| Number | Name | Date |
| --- | --- | --- |
| 2,083,344 | Newhouse et al. | June 8, 1937 |
| 2,144,843 | Hearn | Jan. 24, 1939 |
| 2,201,943 | Dallin | May 21, 1940 |
| 1,636,502 | Fessenden | July 19, 1927 |
| 1,972,889 | Hayes | Sept. 11, 1934 |
| 2,333,688 | Shepard | Nov. 9, 1943 |

FOREIGN PATENTS

| Number | Country | Date |
| --- | --- | --- |
| 288,233 | Great Britain | Sept. 6, 1928 |
| 103,163 | Australia | Feb. 17, 1938 |